United States Patent [19]

Müller

[11] 4,400,399

[45] Aug. 23, 1983

[54] METHOD AND AN ARRANGEMENT FOR FEEDING FISH WITH A FODDER

[75] Inventor: Hans Müller, Erlenbach, Switzerland

[73] Assignee: Chemap AG, Maennedorf, Switzerland

[21] Appl. No.: 286,543

[22] Filed: Jul. 24, 1981

Related U.S. Application Data

[63] Continuation of Ser. No. 42,714, May 25, 1979, abandoned, which is a continuation of Ser. No. 780,250, Mar. 22, 1977, abandoned.

[30] Foreign Application Priority Data

| Mar. 24, 1976 | [CH] | Switzerland | 3706/76 |
| Apr. 29, 1976 | [CH] | Switzerland | 5497/76 |
| Jul. 23, 1976 | [CH] | Switzerland | 9551/76 |
| Jul. 26, 1976 | [CH] | Switzerland | 9623/76 |
| Jul. 27, 1976 | [CH] | Switzerland | 9691/76 |

[51] Int. Cl.³ .............................................. C12K 1/00
[52] U.S. Cl. ........................................ 426/1; 426/92;
  426/623; 426/630; 426/643; 426/656; 426/805;
  119/3
[58] Field of Search ................ 426/1, 2, 302, 309,
  426/89, 92, 623, 630, 635, 643, 805, 656; 119/3

[56] References Cited

U.S. PATENT DOCUMENTS

| 2,951,761 | 9/1960 | Stephan | 426/1 |
| 3,421,899 | 1/1969 | Humphreys | 426/1 |
| 3,733,204 | 5/1973 | Campbell | 426/2 |
| 3,864,498 | 2/1975 | Whitmore et al. | 426/1 |
| 3,876,803 | 4/1975 | Stephan et al. | 426/1 |

OTHER PUBLICATIONS

Rose et al., "The Condensed Chemical Dictionary" Van Nostrand Reinhold Publishers 7th Edition 1970, p. 242.

Primary Examiner—R. B. Penland
Attorney, Agent, or Firm—Michael J. Striker

[57] ABSTRACT

A method of feeding fish in a tank with water comprises the steps of forming in the fish tank a region for feeding fish, introducing into the region a water-stable fodder and forcedly moving the water in the fish tank so as to maintain the fodder floating in the feeding region. In an arrangement for performing the method means forming a feeding station, and means for forcedly moving water in the feeding station are provided. The method of the invention may also comprise the step of utilizing heat liberated during operation of a biological reactor for heating agitated water in the fish tank. A water-stable fish fodder comprises particulate nutrient matter and a protein-containing binder imparting substantial water stability to the fodder formed as a pallet. The binder may be admixed with or may outwardly cover the particulate nutrient matter.

6 Claims, 6 Drawing Figures 4,400,399

METHOD AND AN ARRANGEMENT FOR FEEDING FISH WITH A FODDER

This is a continuation of application Ser. No. 42,714, filed May 25, 1979 which in turn is a continuation of application Ser. No. 780,250, filed Mar. 22, 1977 both abandoned.

BACKGROUND OF THE INVENTION

The present invention relates to a method and arrangement for feeding fish, as well as to a fodder itself.

Arrangements for breeding fish have been proposed, comprising a fish tank with aerating means and closed devices for purification of water in which fish excrements are deposited and discharged as contaminants. Methods and arrangements have also been proposed where a breeding device is combined with a device for biological purification of water. The latter arrangement comprises a bell-shaped insert which provides for separation of fish excrements from water together with rest of the fish fodder. The disadvantages of the above methods and arrangements are that they result in great loss of the fodder which cannot be avoided during the separation of the fish excrements, and in adversely affecting oxygen content of the water.

Fish fodders have been proposed which are pelletized and comprise protein-containing matters such as fish flour, soy flour yeast, a small quantity of grease and carbohydrates, and also the required salts and vitamins. An additional quantity of yeast are introduced into the fodder in order to improve joining of the amino acids. The above yeast is produced in industrial fermentors on the basis of waist carbohydrates such as, for instance, molasses or whey with high aeration. During this process a great quantity of heat is liberated which must be drawn away by cold water.

It has been recognized that a fish fodder preferably must be held in a certain place so that fish can take the movable fodder, leave the place of feeding and thereafter return to the same place to take a new portion of the fodder.

Fish of prey, such as for instance trout or pike, take a fodder while they swim. This means that the pelletized fodder must swim on a water surface during a certain time. However, the known fodder, which is very expensive, does not swim, but slowly sinks in water is deposited on a bottom of the breeding arrangement and mixed with fish excrements.

Another disadvantage of the known fodder, even in the case where it comprises alginate improving its structural durability, is that the not bonded granules of the fodder are decomposed in water in a few minutes. Even slight movement of water results in rapidly generating of undesirable dirt. Because of the great weight of the thus-produced fodder, it rapidly sinks and is deposited on the bottom of the breeding arrangement. The fodder in the form of dirt cannot be taken by fish, such fodder is lost and increases the quantity of contaminants in the breeding arrangement which must be evacuated from the latter.

SUMMARY OF THE INVENTION

Accordingly, it is an object of the present invention to provide a novel method and a novel arrangement for feeding fish, and also to provide a novel fodder for feeding fish which avoid the disadvantages of the prior-art methods, arrangements and fodders.

More particularly, it is an object of the present invention to provide an arrangement, a method and a fodder which improve feeding fish in a fish tank.

Another object of the present invention is to provide such a method and an arrangement for feeding fish which assures that fish more readily take a fodder since the latter uninterruptedly moves.

Still another object of the present invention is to provide such a method and an arrangement for feeding fish which assures that a fodder is not mixed with and contaminated by fish excrements, and thereby is not lost during cleaning a fish tank from the fish excrements.

An additional object of the present invention is to provide a fodder which has such a degree of water stability that it is not decomposed in water and does not sink so as to form deposits on a bottom of a fish tank, and to particularly provide such a fodder which is not decomposed by movement of water even when the latter is forcedly moved in accordance with the method and arrangement of the present invention.

Still additional object of the present invention is to reduce energy losses for heating water in a fish tank by utilization of heat liberated during operation of a biological reactor.

In keeping with these objects and with others which will become apparent hereafter, one feature of the present invention is that the method of the invention comprises the step of forcedly moving water in a fish tank so as to keep a fodder introduced in a feeding region floating in the latter. The arrangement of the invention comprises means for forcedly moving water in a feeding station of a fish tank so as to maintain the fodder floating in the feeding station. In this case, the fish fodder moves and can be taken by fish while they swim. On the other hand, the fish fodder seems to be alive and fish more readily take the fodder.

Another feature of the present invention is that a fodder comprises particulated nutrient matter, and a protein-containing binder admixed or outwardly covering this nutrient matter. Such fodder is water stable and is not decomposed in water when admitted into a fish tank. This means, that the fodder does not sink and mixed with fish excrements but is floating in water and particularly in a region adjacent a water surface so that fish easily take the fodder, and the latter is not lost during evacuating of the fish excrements. The above-described forced movement of the water also prevents the fodder from sinking onto a bottom of the fish tank.

Still another feature of the present invention is that the method of the invention comprises the step of utilizing heat liberated during operation of a biological reactor, for heating water in the fish tank. This reduces energy losses for heating water in the fish tank.

An additional feature of the present invention is that a feeding station in the arrangement of the invention is located in a region of a fish tank which is separated from a region where fish excrements settle so that the fish excrements are not mixed with the fish fodder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
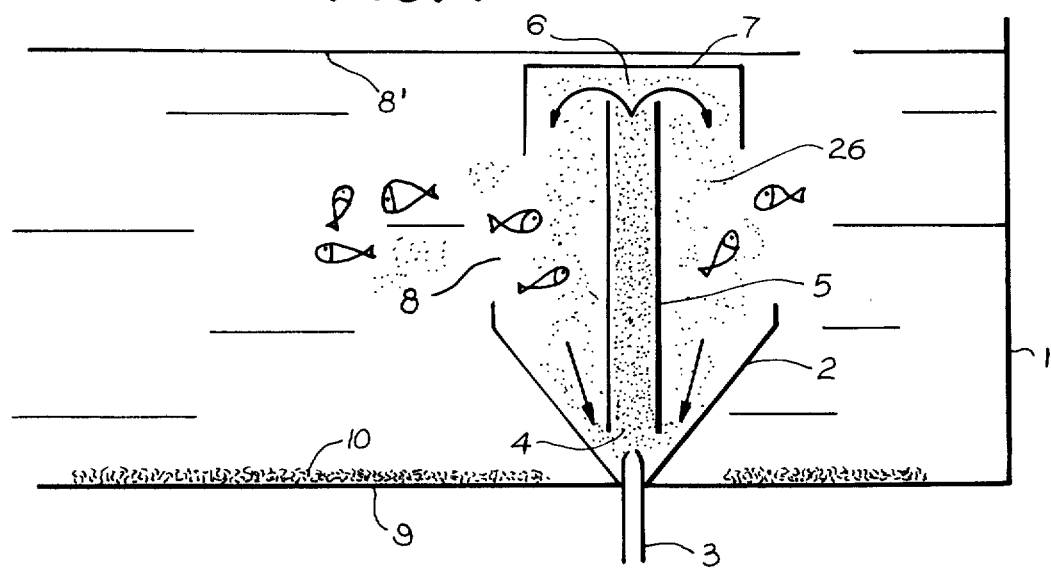
FIG. 1 is a side view of one embodiment of an arrangement for feeding fish of the present invention.

FIG. 1 shows a fish tank 1 and a funnel 2 mounted on a bottom 9 of the tank 1. A pipe 3 is mounted at an apex region of a cone of the funnel 2 and has a reduced outlet end portion provided with an opening 4. A conduit 5 is mounted above the opening 4 and has an opening 6 spaced from the opening 4. A baffle 7 is located above the opening 6 of the conduit tube 5 and forms a cap over the same. The lower edge portions of the baffle 7 and the upper edge portions of the funnel 2 bound together a large opening 8. The above arrangement is completed by a water surface 8 from above, and by the bottom 9 covered with fish excrements from below.

Figure 2:
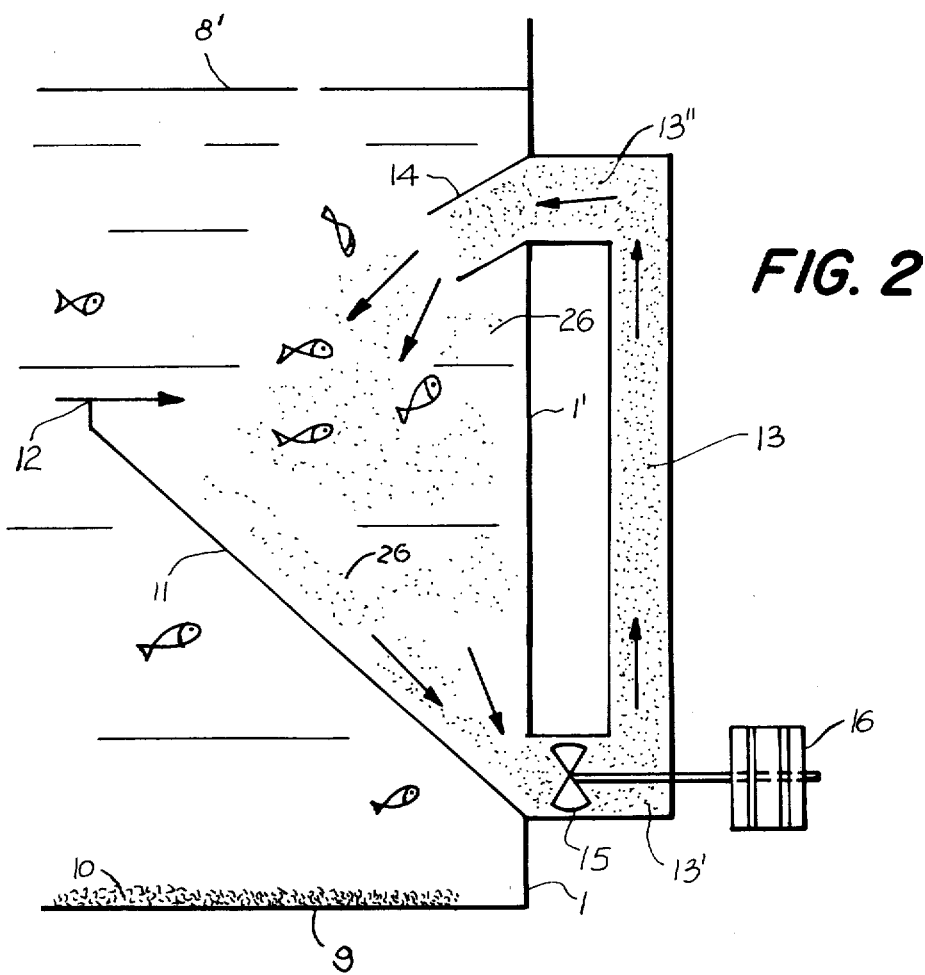
FIG. 2 is a side view of an arrangement for feeding fish in accordance with another embodiment of the present invention.

FIG. 2 shows an arrangement in which an inclined wall 11 is provided instead of the funnel 2, which inclined wall 11 has a vertically upwardly extending portion 12. The thus-constructed inclined wall 11 forms together with a side wall 1' of the fish tank 1 an admitting device for a fish fodder. An ascending pipe 13 is located outside of the fish tank 1 and has a lower portion 13' and an upper portion 13'' communicating with the fish tank 1, so as to form an outlet from and an inlet into the latter, respectively. The upper portion 13'' is connected with a downwardly bent conduit pipe 14. A pump 15 driven by an electric motor 16 is located in the lower substantially horizontal portion 13' of the ascending conduit 13.

Figure 3:
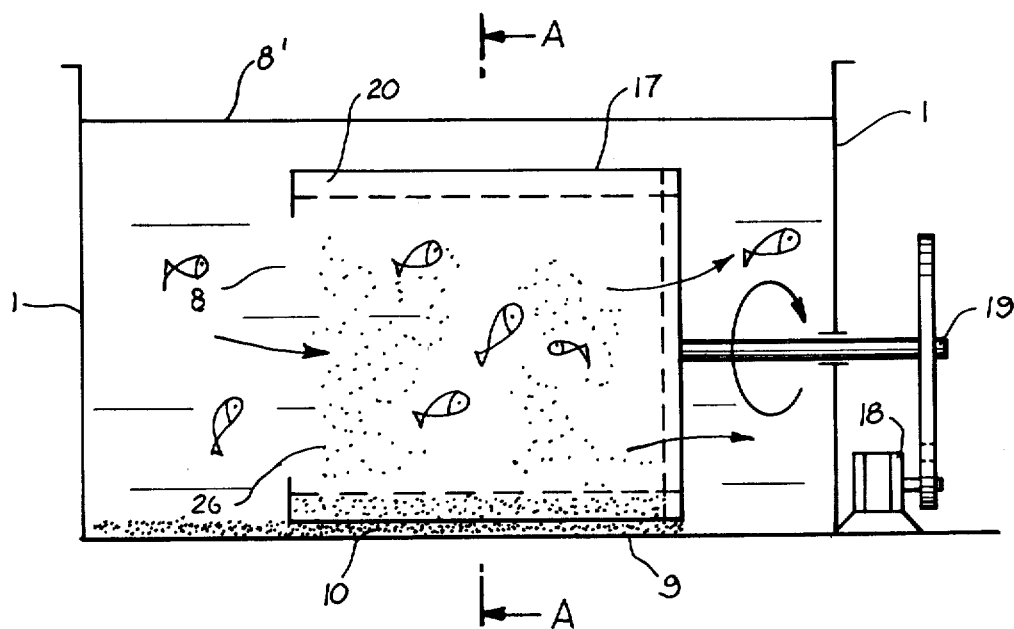
FIG. 3 is a side view of an arrangement for feeding fish in accordance with still another embodiment of the present invention.

In an arrangement shown in FIG. 3 a sieve drum 17 having a longitudinal axis is provided in a fish tank 1, which sieve drum 17 is driven for rotation about the axis by a shaft 19 of an electric motor 18. Baffles 20 are mounted on the inner surface of the sieve drum 17 and extend in the longitudinal direction of the latter. A wall of the sieve drum 17, which is opposite to the drive means, is partially open and forms an opening 8.

Figure 5:
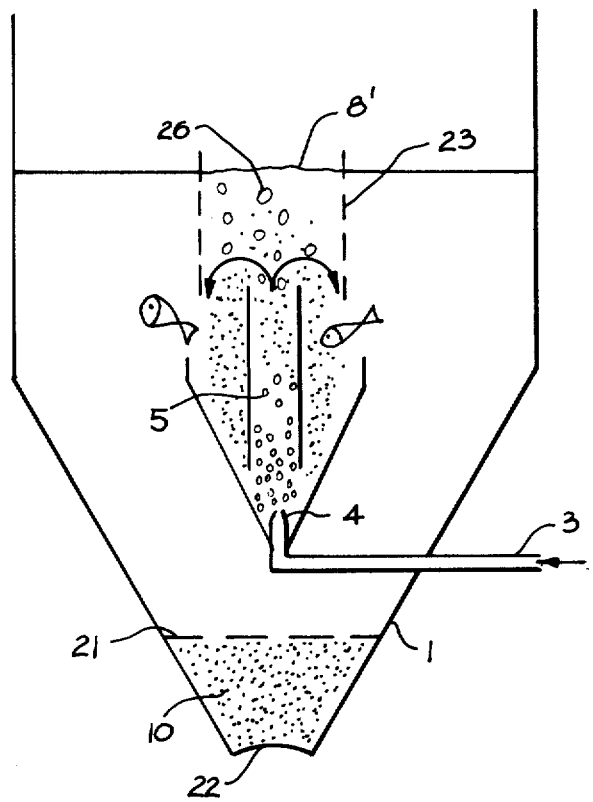
FIG. 5 is a side view of an arrangement for feeding fish in accordance with a further embodiment of the present invention.

FIG. 5 shows a fish tank 1 provided with a feeding device. An upper portion 1'' of the tank is cylindrical, whereas a lower portion 1''' thereof is conical and is provided with a sieve plate 21. A closable opening 22 is formed at an apex region of a cone of the lower portion 1''' of the fish tank 1. An ascending pipe 5 is mounted immediately above an outlet opening 4. A sieve ring 23 projects upwardly beyond the water surface 8.

Figure 6:
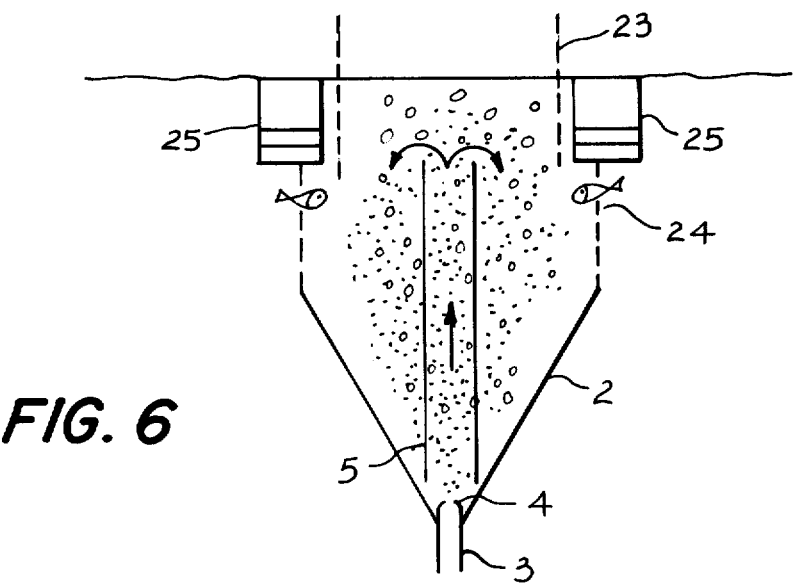
FIG. 6 is a side view of a feeding device in accordance with still a further embodiment of the present invention.

FIG. 6 shows a feeding device which is mounted on one or a few floating members 25 by means of bars 24 or another mounting elements.

During feeding fish a water stable fodder 26 is admitted into the funnel 2, as shown in FIG. 1. Flowing water and/or admitted air generate an upwardly directed stream through the pipe 3. The granulated fodder is upwardly conveyed from the opening 4 through the conduit tube 5 towards the baffle 7. Then, the granules of the fodder downwardly sink outside the conduit tube 5 and again enter the funnel 2. Thus, the fodder performs continuous movement in the feeding arrangement. The opening 8 formed between the baffle 7 and the funnel 2 is large enough for entering fish which search the fodder. Fish excrements 10 are deposited on the bottom 9 of the fish tank 1 and removed therefrom from time to time.

In the arrangement shown in FIG. 2, the fodder is admitted in such a manner that it sinks intermediate the inclined wall 11 and the side wall 1' of the fish tank 1. The pump sucks water and the fodder 26 into the ascending pipe 13, outwardly conveys the same through the pipe 13 and thereafter the thus-conveyed water and fodder 26 is discharged through the conduit pipe 14 into the fish tank 1. Fish catch the fodder which is downwardly discharged from the conduit pipe 14.

Figure 4:
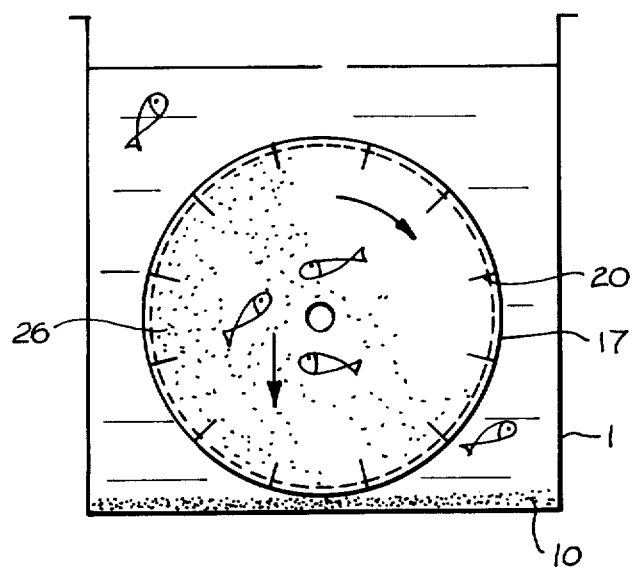
FIG. 4 is a cross-sectional view taken on line A—A of FIG. 3.

In the arrangement shown in FIGS. 3 and 4 the fodder enters the opening 8 of the sieve drum 17 and is moved by the baffles 20 of the rotating drum 17.

In the arrangement shown in FIG. 5 the water stable fodder 26 passes through the sieve ring 23. A stream of air is admitted through the pipe 3, which stream supplies air for breathing the fish and, at the same time, picks up the particles of the fodder 26 by bubbles contained in the stream of air. Fish swim to the moving fodder 26, and immediately after taking the same leave the thus-formed feeding station. Fish excrements pass outside the comparatively small feeding station. The excrements are settled and pass through the sieve plate 21. The particles of the excrements are deposited below the latter and can be removed through the opening 22. The sieve plate 21 prevents upward movement of the excrements.

In FIG. 6 the floating device for feeding fish is shown, which is of substantially the same construction as that shown in FIG. 5.

In accordance with the present invention a fodder is used which is water-stable and is not readily decomposed in water. This fodder comprises prticulate nutrient matter, and a protein-containing binder such as, for instance, gelatin and glue. The nutrient matter is soaked with the above binding substances. The thus-produced fodder slightly swells in water and has a consistency suitable for feeding fish, and at the same time, is sufficiently water stable so that it is not decomposed during such a time which is sufficient for taking the fodder by the fish. In addition, such binder comprises proteins which increase protein content of fodder.

Water stability of the fodder may be further improved by dose adding of tannin and lignin sulfonic acids, or formalin. It is also possible to add another tannin-containing substance, such as for instance flour of milled bark of oak-tree or chestnut tree. The fodder is hardened which hardening does not adversely affect its durability.

The fodder also may be outwardly sprayed with gelatin or plammolitic yeast to obtain the required hardening. This has the advantage that the thus-produced fodder has an outer protective layer and a durable inner core which maintains its form during a long time.

Unicellular protein may also be admixed in the fodder as an inexpensive protein-containing substance, in a quantity equal to 5-10% of the total weight of the fodder mixture. When pure yeast or yeast in a mixture with another substance are used, it is not necessary to use tannin substances for stabilizing the fodder. The fodder containing yeast is musticated in neutral or slightly alkalined state with pH valence near isoelectrical points, and thereafter the mass is dried.

Some examples of preparation of the fish fodder of the invention are given below.

EXAMPLE 1

In this Example yeast itself serves as a binder of the fodder. 500 g of baking yeast is mixed with a small quantity of water so as to make a paste, and further is mixed with soda until the pH is 9. Then the mass is strongly mechanically chewed during 1 hour at a temperature of 60° C. to 90° C. By this operation the mass is agglutinated. Then, hydrochloric acid is admitted into the mass until the pH is 5, and the necessary ingredients are added to the same in an extruder which extrudes the mass in a spaghetti-like form. The extruded mass is dried at a temperature of 50° C. to 110° C., preferably at 80° C. During the process of drying with use of a spray dryer or a roller dryer, the fodder mixture may be simultaneously granulated. The thus-prepared product is easily denaturated so as to not adversely affect the quality of the fish fodder. Elimination of common salt which is formed during neutralization of soda with hydrochloric acid, may be performed by alkalization with $Ca(OH)_2$ and subsequent neutralization with phosphoric acid, or other mineral or organic neutralizing substances. Calcium phosphate is important for building bones of fish. An additional hardening may be attained by use of formaldehyde or other tannin substances suitable for the nutrient matter.

EXAMPLE 2

500 g of the required nutrient ingredients is pelletized in a conventional manner. The thus-produced pallet, having a water content equal to 15–18%, is dipped into a 1–5% solution of gelatin at a temperature of 30° C. to 50° C., preferably 40° C., and then is dried in a dryer. Residual moisture of the thus-treated pellet is of about 15%. The pellet is not decomposed in water during about 1 hour.

EXAMPLE 3

500 g of the required nutrient ingredients is pelletized in a conventional manner. The thus-produced pellet is sprayed with 0.5–1% aqueous solution of gelatin and is then dried. Addition of 0.03–0.09% of formaldehyde in the solution of gelatin prior to the spraying of the latter onto the pellet of the nutrient ingredients, improves water stability of the same without adversely affecting durability of the fodder particles. Preparation of the binder substance itself, for instance of gelatin, can be performed in a simple manner, such as for instance, by dipping of powdered gelatin in warm water at a temperature of 50° C. to 60° C.

Hide glue, bone glue, microorganisms-produced protein, as well as hardened gelatin, unhardened gelatin, yeast and the like, may be used as a binding substance.

The thus-produced fodder slightly swells in water of the fish tank and, at the same time, maintains its water stability during essentially great periods of time.

In accordance with the method of breeding fish of the invention, heat which is liberated during operation of a biological reactor producing the ingredients of the fish fodder, is used for heating water in the breeding arrangement.

It will be understood that each of the elements described above, or two or more together, may also find a useful application in other types of arrangements, methods and compositions, differing from the types described above.

While the invention has been illustrated and described as embodied in a method and an arrangement for feeding fish with a fodder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fish fodder which is not readily soluble in water, consisting of a gelatinless particulate nutrient matter; and a gelatin binder for said gelatinless particulate nutrient matter, said particulate nutrient matter and said gelatin binder being pelletized, said gelatin binder being soluble in warm water so as to facilitate manufacture of the pellet and swelling in cold water so as to improve attractiveness of the pellet to fish, said gelatin binder present in effective amounts to import substantial water stability to the pellet so as to prevent ready dissolution of the same in water while permitting the pellet to float.

2. The fish fodder as defined in claim 1, wherein said particulate nutrient matter comprises particulate nutrient ingredients, and said binder is admixed with said ingredients.

3. The fish fodder as defined in claim 2, wherein said particulate nutrient matter together with said admixed binder forms a core of said pellet, said binder further forming a cover layer outwardly surrounding said core.

4. The fish fodder as defined in claim 1, wherein particulate nutrient matter forms a core of said pellet, and said binder forms a cover layer outwardly surrounding said core.

5. The fish fodder as defined in claim 1, wherein said binder is a substance selected from the group consisting of hardened gelatin and unhardened gelatin.

6. The fish fodder as defined in claim 1, wherein said binder is a hardened binder.

* * * * *